Sept. 28, 1954

F. ROMAIN 2,690,145

BASIN SEEDER

Filed Jan. 19, 1950

Inventor:
Fred Romain
By Willard S. Growe
Atty.

Sept. 28, 1954        F. ROMAIN        2,690,145
BASIN SEEDER
Filed Jan. 19, 1950        5 Sheets-Sheet 2
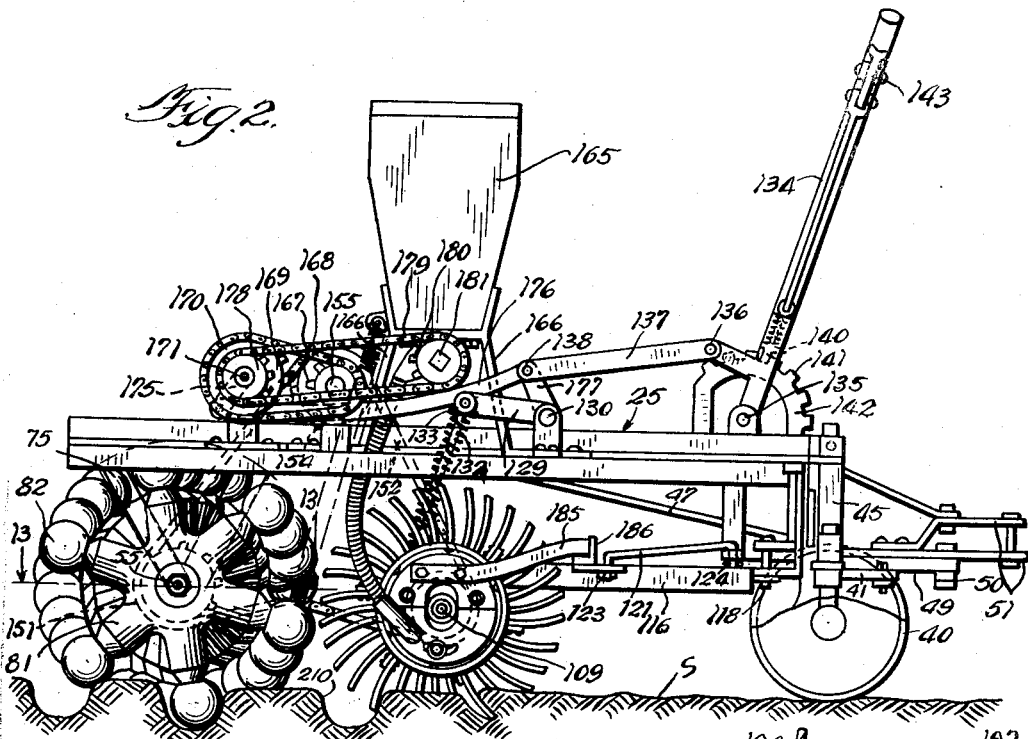
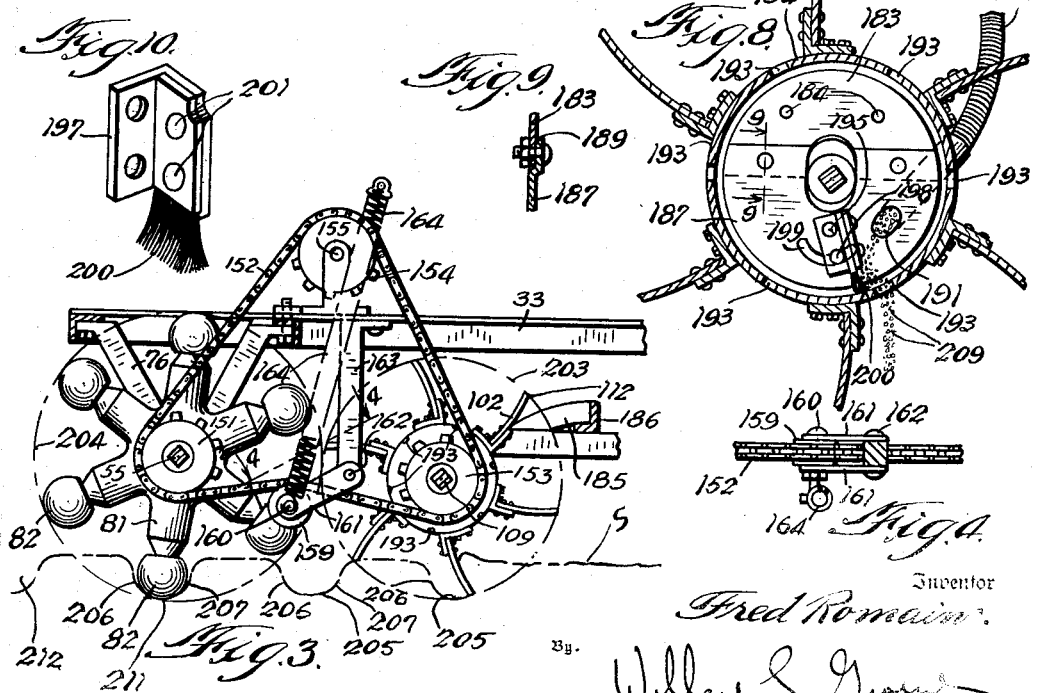
Inventor
Fred Romain
By Willard S. Grown
Attorney.

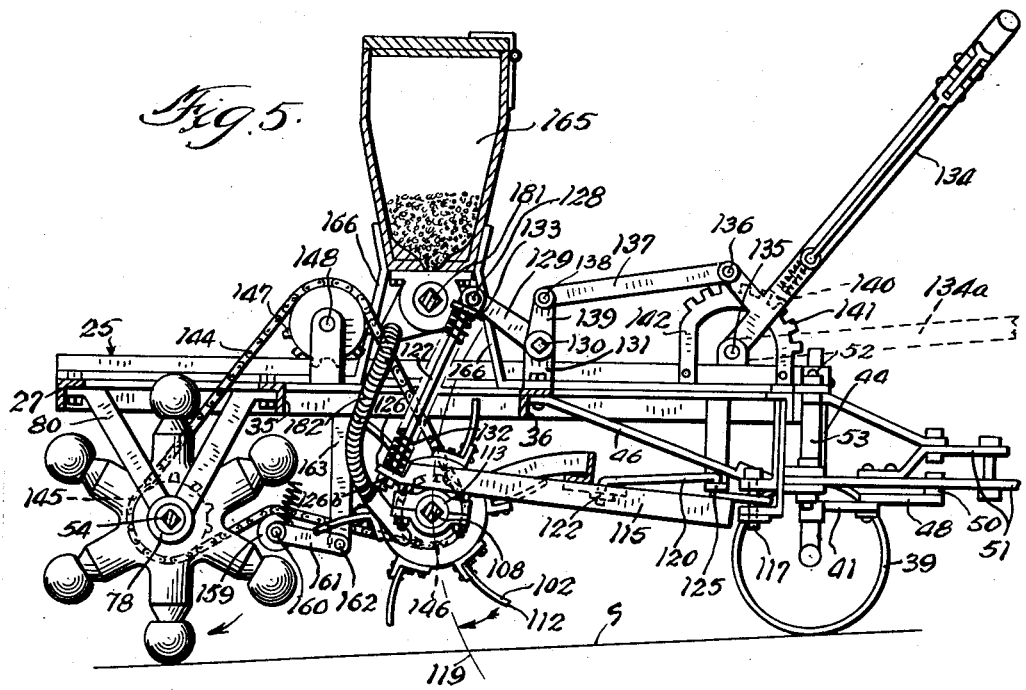
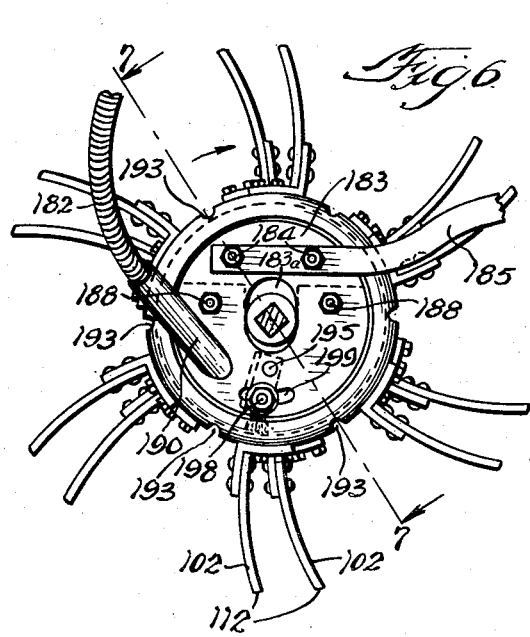
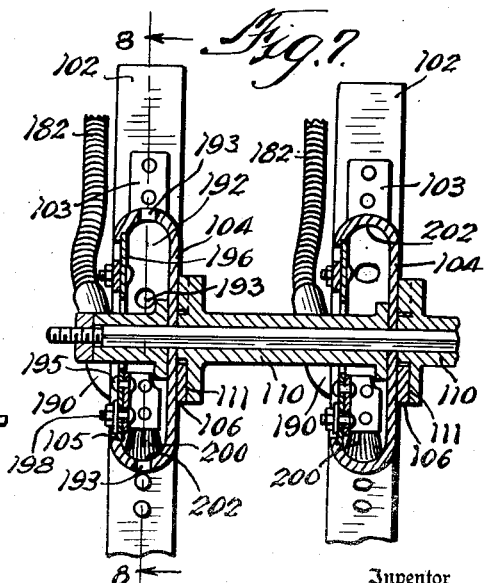

Sept. 28, 1954     F. ROMAIN     2,690,145
BASIN SEEDER
Filed Jan. 19, 1950     5 Sheets-Sheet 4
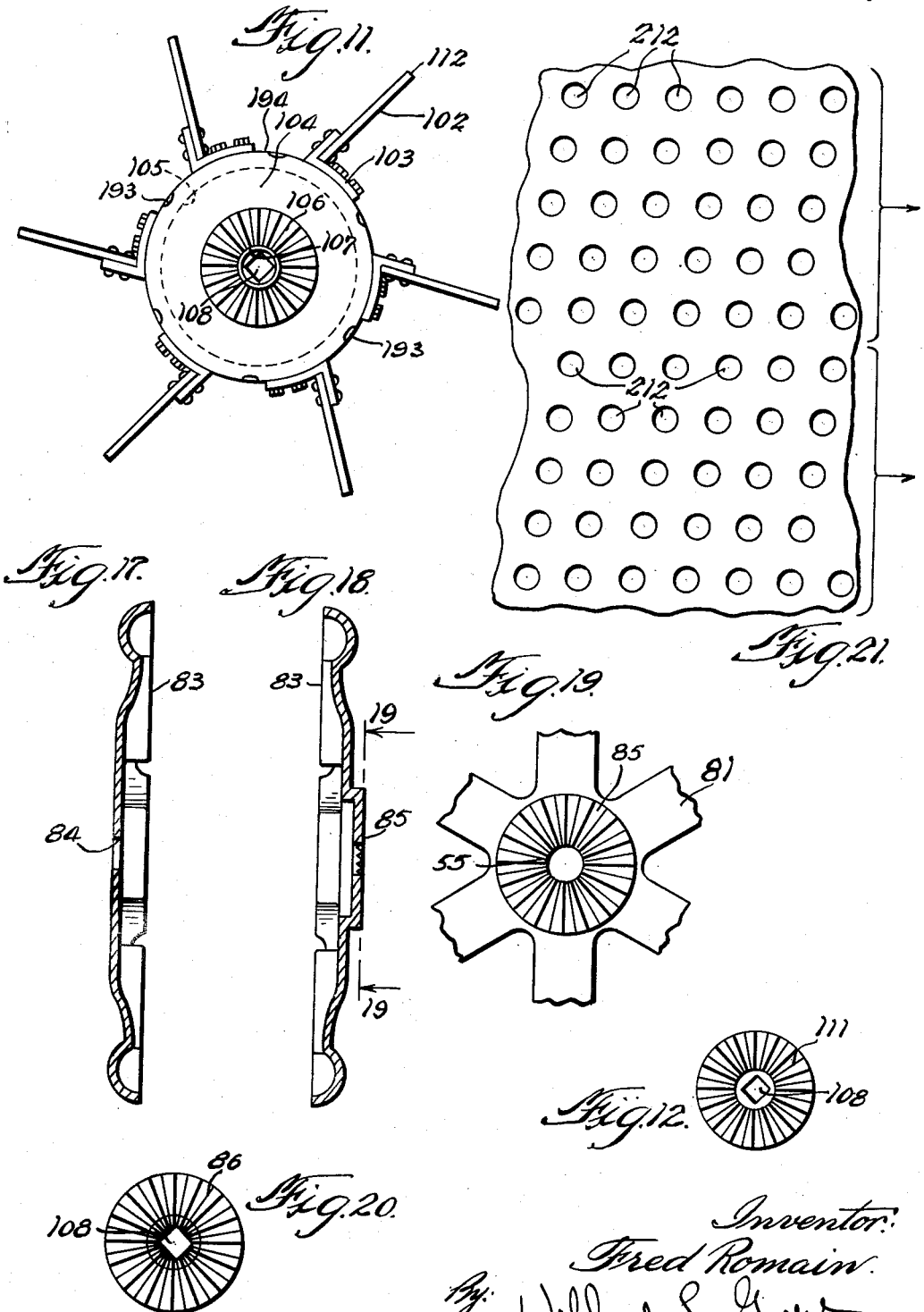

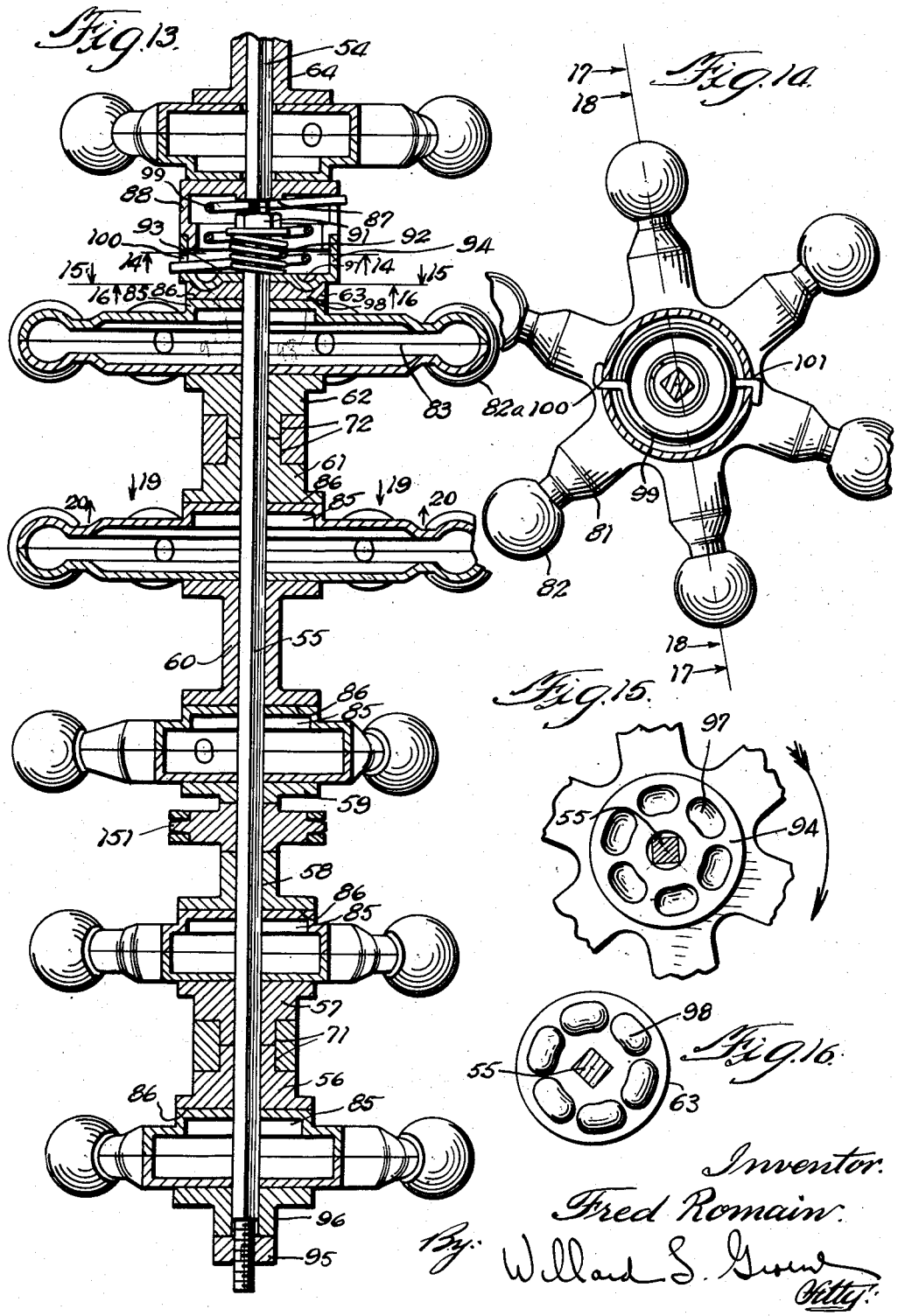

Patented Sept. 28, 1954

2,690,145

UNITED STATES PATENT OFFICE 2,690,145

BASIN SEEDER

Fred Romain, Chester, Mont.

Application January 19, 1950, Serial No. 139,490

3 Claims. (Cl. 111—91)

This invention pertains to improvements in grain drills and more particularly to a basin seeder adapted to sow seed in depressed cavities or pockets below the normal surface of the ground.

One of the objects of this invention is to provide a grain drill or basin seeder which is adapted to sow seed and prepare the soil surface in such a way as to minimize wind erosion and reduce water run-off and at the same time effect a greater retention of rainfall and drifting snow in the soil.

Another object of this invention is to construct a basin seeder or drill which first digs a series of depressed basin shaped cavities, pockets or holes in the soil surface, next deposits desired quantities of seed in each pocket, then deposits a suitable light covering of soil on the seeds, and finally, firmly packs the covered seed in the bottom of the pockets, the whole operation being carried out in an automatic and continuous manner.

Still another object of this invention is to provide a basin seeder which may be passed over the surface of a field so as to plant the seed in a series of closely spaced depressed basins or pockets, which pockets remain intact during the growing period of the grain so as to entrap drifting snow and soil and retain a maximum of rainfall, increase the retained moisture in the soil, and bring about a greater yield per acre than with former methods of planting.

Still another object of this invention is to have a grain drill arranged to sow seed in a series of depressed pockets in the field surface to control erosion and increase retention of moisture, which grain drill may be operated over the land surface independent of considerations of topography and land contour, while at the same time giving effective control of the soil surface for any degree of steepness of slope to be seeded.

And a further object is to provide a grain drill capable of sowing seed in soil containing a high degree of overlying straw mulch.

Further features and advantages of this invention will appear from a detailed description of the drawings in which:

Figure 2 is a right hand side elevation of the grain drill indicated by the line 2—2 in Figure 1.

Figure 3 is an enlarged fragmentary sectional view on the line 3—3 of Figure 1.

Figure 4 is a fragmentary section on the line 4—4 of Figure 3.

Figure 5 is a transverse sectional view on the line 5—5 of Figure 1.

Figure 6 is an enlarged fragmentary section on the line 6—6 of Figure 1.

Figure 7 is a fragmentary sectional view on the line 7—7 of Figure 6.

Figure 8 is a section on the line 8—8 of Figure 7.

Figure 9 is a fragmentary section on the line 9—9 of Figure 8.

Figure 10 is a perspective view of the seed brush shown in Figure 8.

Figure 11 is a sectional view on the line 11—11 of Figure 1.

Figure 12 is a sectional view on the line 12—12 of Figure 1.

Figure 13 is an enlarged sectional view on the line 13—13 of Figure 2.

Figure 14 is a sectional view on the line 14—14 of Figure 13.

Figure 15 is a sectional view on the line 15—15 of Figure 13.

Figure 16 is a sectional view on the line 16—16 of Figure 13.

Figure 17 is a sectional view on the line 17—17 of Figure 14.

Figure 18 is a sectional view on the line 18—18 of Figure 14.

Figure 19 is a sectional view on the line 19—19 of Figure 13.

Figure 20 is a sectional view on the line 20—20 of Figure 13.

Figure 21 is a diagram showing the arrangement of the depressed cavities formed in the soil surface by the grain drill.

Figure 1:
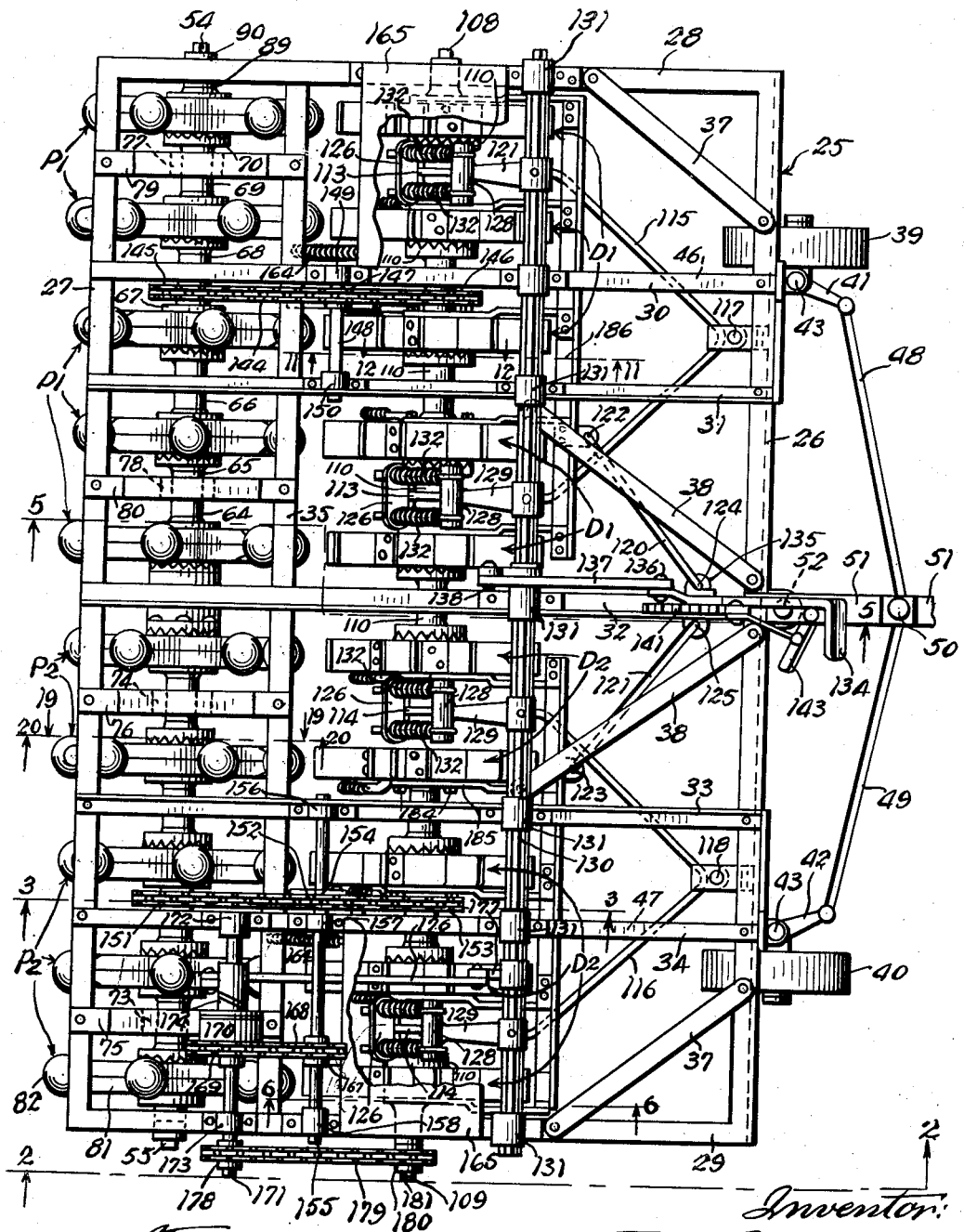
Figure 1 is a plan view, partly broken away, of a grain drill incorporating the features of this invention.

As illustrative of one embodiment of a grain drill incorporating the features of this invention, there is shown a drill having a main frame 25, Figure 1, consisting of the front member 26, the rear member 27, and the side members 28 and 29, together with the members 30, 31, 32, 33 and 34 located parallel to the side members, the members 35 and 36 located parallel to the front and rear members, and the angular braces 37 and 38, all rigidly secured together. The front portion of the main frame is supported on steerable wheels 39 and 40 which are carried on suitable steering knuckles 41 and 42 arranged to swing about vertical axes 43 in the bearings 44 and 45 fixed at their upper ends to the front member 26 and connected at their lower ends through the tie rods 46 and 47 to the member 36 of the frame, Figures 2 and 5. The steering knuckles 41 and 42 are connected through drag links 48 and 49, to the pivot pin 50, fixed on the towing arm or tongue 51 which in turn is pivotally mounted for swinging about a vertical axis 52 in a bearing 53 secured to the front member 26 of the frame. The tongue 51 is hitched to a suitable tractor which may readily tow the drill in any desired direction by this steering arrangement.

The rear portion of the main frame 25 is supported on a series of packer wheels P1 and P2, Figure 1, carried on the respective packer shafts 54 and 55. The detailed construction of the packer shaft arrangement is best shown in Figure 13. The shaft 55 is preferably of square cross section and carries a series of spacing members, 56 through 62 inclusive, each of which has square bores nicely fitting over the shaft 55. Similarly, there are provided spacing members, 64 through 70, inclusive, Figure 1, on the shaft 54. Supporting bearing surfaces 71 and 72 formed on the respective members 56 and 57, and 61 and 62, are journaled in suitable bearings 73 and 74 on the downwardly extending angular brackets 75 and 76 while the shaft 54 is similarly supported on bearings 77 and 78 on the brackets 79 and 80.

Each of the packer wheels P1 and P2 comprises a series of radially projecting arms 81, six in number in this particular embodiment, which terminate in spherical end portions 82 which roll in meshing relationship with preformed basins in the soil surface. These wheels may be preferably constructed of two half pieces formed as steel stampings as best shown in Figures 13, 14, 17, and 18. The two half pieces of Figures 17 and 18 are placed together and welded along the line 83 to form the complete packer wheel unit. The wheel is constructed with a round bore 84 which nicely fits over the edges of the square shafts 54 and 55 to properly center the packer wheels on these shafts. One of the side faces of the hub of the packer wheels is formed with serrations or teeth 85 meshed with mating teeth or serrations 86 on the spacing members 56, 58, and 60, and slip clutch member welded to 63 the shaft 55, and 65, 66, 68, and 70 for the shaft 54. The purpose of this arrangement is to make it possible to position and lock each of the packer wheels relative to each other so that the spherical end portions 82 can be arranged in a helically disposed manner as best seen in Figures 1 and 2, and may be positively held in this position under all operating conditions. In order to lock all of the packer wheels P1 together as described, the shaft 54 is securely welded at 87 to the cup member 88, Figure 13, and has a clamping washer 89 and binding nut 90 at its other end, Figure 1, which may be tightened down to thus lock all of the packer wheels securely to the shaft 54. The shaft 55 has fixed on it a nut 91 which confines a compression spring 92, Figure 13, up against the face 93 of the slip clutch member 94 and on its other end is a clamping nut 95 bearing against a clamping washer 96 for holding the packer wheels P2 together while at the same time allowing a limited axial shifting of the member 94 relative to the shaft 55.

Both of the shafts 54 and 55 are normally retained in a predetermined indexed position relative to one another so as to maintain the aforementioned helical arrangement of the basin contacting spherical end portions 82 of the packer wheels P1 and P2. However, in instances where the grain drill is operated in short turns, it is desirable to have one or the other of the groups P1 or P2 of packer wheels rotate ahead of the other. During this condition the advance of one group over the other is effected instantaneously from one indexed position to another so as to avoid any gradual or intermediate spacing of the packer wheels and basins formed by one group relative to the other in making short turns at the end of a field. To this end there is provided a series of raised portions 97, Figure 15, on the cup member 94 which are arranged to engage in mating depressed detent cavities 98 formed in the member 63, Figure 16. The member 94 is free to rotate relative to the shaft 55, but normally maintains the drive through the slip clutch members 94 and 63 except when exceptionally sharp turns are made. In order to effect an instantaneous shift from one indexed position to another of the members 97—98, there is provided a torsion spring 99 having one of its ends fixed at 100 to the member 94 and having its other end fastened at 101 to the member 88 so that as the grain drill is driven around a turn, the spring 99 initially tends to prevent shifting of the members 97—98 by providing a certain amount of yieldingly drive between shafts 54 and 55, but as the turn is continued additional torsion is built up in the spring 99 until finally the members 97 and 98 instantly shift relative to one another to a new indexed position for the shafts 54 and 55. The spacing of the members 97 and 98 is so arranged in relation to the spacing of the spherical ends 82 of the packer wheels that the two groups P1 and P2 are always kept in proper indexed relationship to maintain the desired helical arrangement of the ends 83. Preferably the end portions 82 may be covered with rubber or the like material 82a, as such materials have less tendency for the soil to adhere to these portions and it also provides a more satisfactory condition when transporting the grain drill over hard surfaced roads.

Movably mounted on the main frame 25 for vertical adjustment relative to the soil surface S are the two groups of digger wheels D1 and D2. Each of the digger wheels, Figure 11, comprises a series of radially disposed curved basin digging blades 102 equal in number and spacing to the arms 81 of the packer wheels. Each of the blades 102 is rigidly fixed by a suitable bracket 103 to the periphery of a hollow drum shaped hub member 104 which has an opening 105 on one side and a serrated portion 106, similar to the portions 85 of the packer wheels, on the hub portion 104. A round bore 107, Figure 11, serves to nicely center the digger wheels D1 and D2 on the respective digger shafts 108 and 109. Spacing spools 110, Figures 1 and 7, having mating serrated portions 111 engaging the serrated portions 106 of the digger wheels, serve to properly position and hold the digger wheels with the ends 112 of the blades 102 in the same desired helically disposed position as that of the packer wheel ends 82. The digger wheel shafts 108 and 109 are respectively journaled in suitable bearings 113 and 114, Figure 1, carried on the respective bails 115 and 116. The bail 115 is universally mounted at 117 for articulated movement on the front portion of the main frame 25 while the bail 116 is similarly mounted at 118. Each of the bails 115 and 116 is thus free to swing the shafts 108 and 109 up and down in a vertical direction and to allow either end of the bail to move up and down independently relative to the ground surface S as indicated by the line 119 in Figure 5. Stabilizer links 120 and 121 are connected at 122 and 123 to the bails 115 and 116, the links being connected at 124 and 125 to the main frame 25 in order to key the diggers D1 and D2 in alignment with the ends 82 of the packer wheels.

The rear ends of the bails 115 and 116 have lugs 126 through which pass the eye bolts 127. A suitable adjusting nut and washer 126b are provided on the eye bolts below the lugs 126. The eye bolts 127 are pivotally connected at 128 to a series of lever arms 129 secured to the rock shaft 130 journaled on suitable bearings 131 carried on the main frame 25. Compression springs 132 are confined between the upper side of the lugs 126 of bails 115 and 116 and abutment washers 133 adjacent to the pivot pins 128 so as to normally hold lugs 126 of the bails down against the nut and washer 126b while at the same time providing resilient yielding means to allow the bails to be moved forcibly upwardly compressing the springs 132 in the event a rigid obstruction, such as a rock or a root, should be encountered by the diggers and thereby avoid damage to the apparatus. By adjusting the nut and washer 126b, the effective force of the springs 132 may be regulated in accordance with the character of the soil being worked, so that the digger wheels remain at full depth as set by lever 134 except when an obstruction is encountered.

The depth of digging is regulated by the position of the control lever 134 pivotally mounted at 135 on the main frame 25 and having a pivotal connection 136 connected to a link 137 which in turn is connected at 138 to the lever arm 139 fixed to the rock shaft 130 so that swinging of the lever 134 effects raising and lowering of the bails 115 and 116. A suitable latch 140 engaging in the notches 141 of the latch segment 142 fixed to the main frame 25 is controlled by the release lever 143 in a suitable manner so that the lever 134 and the depth of the digger of the blades 102 may be set to any desired position.

The packer wheels P1 and digger wheels D1 are rotated in synchronism to keep the ends 112 of the digger blades in proper timed relationship with the ends 82 of the packer wheels by means of the driving chain 144, Figures 1 and 5, which operates over a sprocket 145 fixed to the packer shaft 54 and over a sprocket 146 fixed to the digger shaft 108. The chain also passes over a sprocket 147 fixed to the shaft 148 journaled on suitable bearings 149 and 150 fixed to the members 30 and 31 on the main frame 25. Similarly, the packer shaft 55 is provided with a sprocket 151, Figures 1 and 3, over which operates the chain 152 which chain in turn operates over a sprocket 153 fixed to the digger shaft 109 and also over the sprocket 154 fixed on the shaft 155 which is journaled in suitable bearings 156, 157, and 158 on the members 33, 34, and 29 respectively of the main frame 25. Referring particularly to Figures 3 and 4, both of the chains 144 and 152 are kept in proper tension at all times for any adjusted position of the cradles 115 and 116 by means of the tension rollers 159 journaled at 160 on the outer ends of the links 161 pivotally supported at 162 on the brackets 163 fixed to the members 30 and 34 of the main frame 25. The links 161 are normally pulled upwardly by the tension springs 164 to force the rollers 159 yieldingly into engagement with the chains 144 and 152.

Seed is provided for the drill by means of a conventional hopper mechanism 165, shown broken away in Figure 1 to better illustrate the machine, which is mounted on suitable supports 166 on the main frame 25. The hopper mechanism 165 is driven by the rotation of the packer wheels as the grain drill is pulled over the field. This mechanism comprises a sprocket 167 fixed to the shaft 155, Figures 1 and 2, over which operates the driving chain 168 which in turn operates over the sprocket 169 of a suitable clutch 170 journaled on the shaft 171 journaled on suitable bearings 172 and 173 carried on the members 34 and 29 of the main frame 25. A suitable clutch operating member 174 is connected through a lever arm 175 and the link 176 to a lever arm 177 fixed to the rock shaft 130 so that when the lever 134 is moved to fully retracted position of lifting of the digger wheels from the soil surface S, the clutch 170 disconnects drive from the chain 168 to the shaft 171. When the lever 134 is moved to lower the digger wheels to effect a digging operation, the clutch member 170 then connects the power drive from chain 168 to the shaft 171. On the outer end of the shaft 171 is a sprocket 178 over which operates a chain 179 connected to the sprocket 180 fixed on the operating shaft 181 of the seed hopper mechanism 165.

Since the feed hopper 165 is of conventional construction, the details of its construction and operation upon rotation of the shaft 181 need not be described in detail, it being sufficient to state that a series of flexible seed conductor pipes 182, one for each of the digger wheels D1 and D2, convey desired amounts of seed to be planted as the grain drill is moved over the field. A member 183, Figures 6 and 8, having a slot 183a is provided to close the opened end 105 of the hub portion 104 of each digger wheel and is supported by suitable bolts 184 to appropriate bracket arms 185 fixed to the cross rails 186 attached to the bails 115 and 116. To the lower portion of the member 183 is attached the segmental plate 187 by means of the bolts 188 and the lap joint 189 as best seen in Figure 9. The seed feeding pipes 182 are connected to the angularly downwardly positioned nozzles 190 opening at 191, Figure 8, into the seed chamber 192 of the digger wheels D1 and D2. A series of seed openings 193 open radially outwardly from the chamber 192 through the periphery 194 of the hub portion 104 of the digger wheels.

Pivotally mounted on a pivot screw 195 on the inner face 196 of the member 187 is the brush holder angle plate 197, shown best in Figures 8 and 10, which has a second mounting bolt 198 adjustable in an arcuate slot 199 formed in the member 187, so that the member 197 may be clamped to various adjusted positions about the pivot 195 to vary the relative position of the seed brush 200, fixed by suitable rivets 201 to the member 197, in regard to the inner surface 202 of the chamber 192.

The operation of the grain drill is as follows: When the grain drill is to be transported to the location where the seeding is to be done, the control lever 134 is moved to a position 134a to fully retract the digger wheels to upward position as shown in Figure 5. The drill may then be rolled along freely on the wheels 39 and 40 and on the packer wheels P1 and P2, the helical arrangement of these packer wheels permitting a smooth rolling action for the grain drill under these conditions.

When the device is to be put into operation to seed a field, the control lever 134 is moved to a desired position, as shown in Figure 2, so as to lower the digger wheels to operating position. Referring to Figure 3, it is to be noted that the diameter 203 of the path of rotation of the edges 112 of the digger blades 102 is of smaller size than the diameter 204 of the path of rotation of the spherical ends 82 of the packer wheels. As the grain drill moves forward, the various digger blades 102 are projected forwardly and downwardly into the soil surface. Since the operating diameter 203 of the edges 112 is smaller than the diameter of the packer wheels, the blades 102 will form flat bottoms 205 in the depressed holes in the soil surface S during the time the blades are extending vertically downwardly. Steep sloping sides 206 are formed as the blades move down into the soil and, steep sloping sides 207 as they withdraw from the depressed holes in the surface S. The widened flat bottoms 205 result because the periphery of the diameter of rotation 203 is moving slightly more rapidly at the bottom 205 of the hole than the actual forward movement of the axis of rotation 208 of the digger wheels, since the larger diameter 204, which takes its drive from the soil surface S, is connected to rotate the digger wheels at the same speed as the packer wheels. Seed is applied from the nozzles 191 into the chambers 192 behind the brush 200, Figure 8, which accumulates and compacts the seed into a group 209 down against the brush 200. As the hub 104 rotates, a seed opening 193 passes under the brush 200 and then as it comes out from under the brush, the group of compacted seeds 209 drop out and fall to the bottom 205 of a hole that has just been opened by a digging blade as best seen in Figure 3.

Immediately following the digger blade, a spherical end 82 of a packer wheel bumps the loose dirt at the point 210 at the top rear portion of a hole that has just been dug, knocking the loose soil down into the hole over the seeds deposited at 205 in the bottom of the hole, properly covering up the seeds. Continued rolling action of the packer wheel brings the spherical end to the bottom of the hole to pack the dirt securely around the seeds, as shown at 211 and then withdraws itself out of the hole leaving the seeds properly planted in the depressed pocket below the soil surface S. Each one of the digger wheels and packer wheels perform this operation so as to produce a pattern of planting, as shown in the diagram Figure 21, so that the entire field surface S is completed with an arrangement of depressed pockets 212 as shown.

In this way the seeds are located in the soil in such a manner as to receive a maximum of run-off from the soil surface S and at the same time retain drifting snow. It is to be further noted that the action of the digger blades 102 in moving forwardly and downwardly into the soil surface S, then dragging along the bottom of the hole due to the differential speed of movement created by the greater diameter of the packer wheels over that of the digger wheels, and the upwardly and forwardly withdrawing movement of the blades from the soil particularly adapts the apparatus to soil surfaces having a high concentration of thick and matted mulch. In this way the advantage of utilizing fields with thick straw mulch on the surface can be readily undertaken.

Having thus fully described this invention and its numerous attendant advantages, it is obvious that many changes may be made in the form, construction and arrangement of the parts without departing from the spirit or scope of the invention or sacrificing its attendant advantages, the form herein described being a preferred embodiment for purposes of exemplifying this invention.

The invention is claimed as follows:

1. A basin seeding implement, comprising a frame of horizontal transverse extent, dirigible soil-contacting wheels mounted on and supporting the front of said frame, a series of soil-contacting packer wheels journaled on the rear of said frame to rotate about a horizontal transverse axis, said packer wheels being transversely spaced along said axis and supporting the rear of said frame, each of said packer wheels including a plurality of spokes radiating from said axis and spaced therearound with a soil-packing enlargement on the outer end of each spoke, a series of digger wheels supported from said frame for rotation about a generally horizontal transverse axis in front of said packer wheels by means providing for vertical swinging and lateral tilting of the axis of said digger wheels, the number of digger wheels being identical to the number of packer wheels, said digger wheels being transversely spaced the same as said packer wheels and arranged in fore-and-aft alignment therewith, each of said digger wheels having digging blades extending generally radially from the axis of the digger wheels and spaced therearound the same as the spokes of the packer wheel aligned to the rear, the radial extent of said blades being less than the radial extent of said spokes, drive means interconnecting said packer wheels and said digger wheels to cause synchronized rotation of said digger wheels with rotation of said packer wheels so that said blades form basins in the soil and the soil-packing enlargements mesh with said basins to pack the same, and seeding means for discharging seed into said basins prior to packing including a distributor mounted on each digger wheel and rotatable therewith and arranged to discharge seed behind a blade into a basin being formed in the soil by the blade; whereby passage of said implement across a field leaves a series of seeded and packed basins in the soil to entrap drifting snow, retaining snow, water and rain for increasing moisture and reducing soil erosion.

2. A basin seeding implement comprising, a frame, dirigible soil-contacting wheels mounted on and supporting the front of said frame, a series of soil-contacting packer wheels mounted on and supporting the rear of said frame arranged for rotation about and transversely spaced on a horizontal transverse axis, a plurality of radially disposed spokes peripherally spaced around each of said packer wheels, soil-packing abutment surfaces on the outer ends of each of said spokes, a series of digger wheels carried on said frame mounted for rotation about a generally horizontal transverse axis in front of said packer wheels, the mounting of said digger wheels including means providing for vertical swinging and lateral tilting of the axis of said digger wheels, the number of digger wheels being identical to the number of packer wheels, said digger wheels being transversely spaced the same as said packer wheels and arranged in fore-and-aft alignment therewith, radially disposed digging blades on each of said digger wheels and spaced therearound the same as the spokes of the packer wheel aligned to the rear, the radial extent of said digger blades being less than the radial extent of said spokes, drive means interconnecting said packer wheels and said digger wheels to cause synchronized rotation of said digger wheels upon rotation of said packer wheels so that said digger blades form basins in the soil, said soil-packing abutment surfaces on said packer wheel spokes engaging in meshing relationship with said basins to pack the same, and seeding means for discharging seed into said basins prior to packing including a distributor mounted on each digger wheel and rotatable in timed relationship therewith and arranged to discharge seed behind a blade into a basin being formed in the soil by the blade.

3. A basin seeding implement including, a frame, dirigible soil-contacting wheels mounted on and supporting the front of said frame, a series of soil-contacting packer wheels located in transverse axial spaced relationship to support the rear of said frame, a plurality of radially disposed spokes on each of said wheels, soil packing abutment surfaces on the outer ends of said spokes, a series of digger wheels in front of said packer wheels located in the same transverse axial spaced relationship to and aligned with said packer wheels, means supporting said series of digger wheels on said frame for vertical swinging and lateral tilting of the axis of said digger wheels, a series of radially disposed digger blades on each of said digger wheels of the same number and peripheral spacing as the spokes of the corresponding aligned packer wheel, the radial extent of the outer ends of said blades being less than the radial extent of said spokes, drive means interconnecting said packer wheels and said digger wheels to cause synchronized rotation of said digger wheels with rotation of said packer wheels so that said blades form basins in the soil, said soil packing abutment surfaces on said spokes meshing with said basins to pack the same, and seeding means on said frame comprising means for discharging seed into said basins prior to packing including a seed distributor mounted on each digger wheel and rotatable therewith arranged to discharge seed behind a blade into a basin being formed in the soil by the blade so that passage of said implement across a field leaves a series of seeded and packed basins in the soil to entrap drifting snow and rain for increasing moisture retention and reducing soil erosion.

References Cited in the file of this patent

UNITED STATES PATENTS

| Number | Name | Date |
|---|---|---|
| 53,072 | Wiley | Mar. 6, 1866 |
| 91,867 | Reister | June 29, 1869 |
| 196,954 | Terry | Nov. 6, 1877 |
| 242,335 | Lang | May 31, 1881 |
| 279,027 | Shortbridge | June 5, 1883 |
| 331,588 | Walker et al. | Dec. 1, 1885 |
| 430,451 | Walker | June 17, 1890 |
| 491,887 | Hoffmann | Feb. 14, 1893 |
| 809,716 | Miller | Jan. 9, 1906 |
| 811,606 | Williams | Feb. 6, 1906 |
| 871,617 | Oestergard | Nov. 19, 1907 |
| 925,565 | Curtis | June 22, 1909 |
| 1,060,548 | Haralson | Apr. 29, 1913 |
| 1,218,919 | Youngren et al. | May 13, 1917 |
| 1,226,515 | Hicks | May 15, 1917 |
| 1,299,064 | Timmons | Apr. 1, 1919 |
| 1,405,001 | Reichelt | Jan. 31, 1922 |
| 1,615,902 | Foster | Feb. 1, 1927 |
| 1,689,262 | Van Dan Ende | Oct. 30, 1928 |
| 1,864,122 | Cole | June 21, 1932 |
| 2,228,389 | Garey | Jan. 14, 1941 |
| 2,229,746 | Krause | Jan. 28, 1941 |
| 2,284,172 | Silver | May 26, 1942 |
| 2,314,035 | Dontje | Mar. 16, 1943 |
| 2,359,206 | Currie | Sept. 26, 1944 |
| 2,406,500 | Karl | Aug. 27, 1946 |
| 2,551,132 | Jacobus | May 1, 1951 |

FOREIGN PATENTS

| Number | Country | Date |
|---|---|---|
| 6,855 | Germany | Aug. 20, 1879 |
| 10,525 | Great Britain | 1845 |
| 88,028 | Sweden | Dec. 1, 1936 |
| 251,388 | Germany | Oct. 2, 1912 |
| 281,609 | Italy | Jan. 17, 1931 |
| 439,559 | Germany | Jan. 13, 1927 |
| 698,467 | France | Nov. 18, 1930 |